(12) United States Patent  
Reinhold

(10) Patent No.: US 7,494,061 B2  
(45) Date of Patent: Feb. 24, 2009

(54) SYSTEMS AND METHODS FOR IDENTITY VERIFICATION USING CONTINUOUS BIOMETRIC MONITORING

(75) Inventor: Dennis J. Reinhold, Dallas, TX (US)

(73) Assignee: Evercom Systems, Inc., Dallas, TX (US)

( * ) Notice: Subject to any disclaimer, the term of this patent is extended or adjusted under 35 U.S.C. 154(b) by 209 days.

(21) Appl. No.: 11/480,258

(22) Filed: Jun. 30, 2006

(65) Prior Publication Data

US 2008/0040780 A1 Feb. 14, 2008

(51) Int. Cl.  
*G06K 5/00* (2006.01)

(52) U.S. Cl. ........................ 235/382; 235/375

(58) Field of Classification Search ............... 235/382, 235/375, 470, 487  
See application file for complete search history.

(56) References Cited

U.S. PATENT DOCUMENTS

| | | | |
|---|---|---|---|
| 5,872,834 A | 2/1999 | Teitelbaum | |
| 6,628,757 B1 | 9/2003 | Cannon et al. | |
| 6,819,219 B1 | 11/2004 | Bolle et al. | |
| 2003/0163710 A1 | 8/2003 | Ortiz et al. | |
| 2004/0215968 A1 | 10/2004 | Rodwell et al. | |
| 2005/0043014 A1 | 2/2005 | Hodge | |
| 2005/0138391 A1* | 6/2005 | Mandalia et al. ............ | 713/186 |
| 2007/0027807 A1* | 2/2007 | Bronstein .................... | 705/44 |
| 2007/0041545 A1* | 2/2007 | Gainsboro ................... | 379/188 |
| 2007/0061590 A1* | 3/2007 | Boye et al. .................. | 713/186 |
| 2007/0121882 A1* | 5/2007 | Timmins et al. ........ | 379/218.01 |

FOREIGN PATENT DOCUMENTS

WO WO 00/28721 5/2000

OTHER PUBLICATIONS

European Search Report dated Nov. 21, 2007.  
International Search Report and Written Opinion of the International Searching Authority for International Application No. PCT/US 07/72551 dated Jan. 24, 2008.

* cited by examiner

*Primary Examiner*—Edwyn Labaze  
(74) *Attorney, Agent, or Firm*—Slater & Matsil, L.L.P.

(57) ABSTRACT

Systems and methods for verifying the identity of a person operating a device are shown. In some representative embodiments, a method comprises authorizing a person to operate a device, continuously monitoring a biometric trait of a device operator, and using the monitored biometric trait of the device operator to verify, during operation of the device, whether the device operator is the authorized person. In other representative embodiments, a system comprises a biometric sensor associated with a device, and a continuous biometric monitoring (CBM) module coupled to the biometric sensor. The CBM module may be adapted to continuously acquire a one biometric sample from the device operator during operation of the device.

26 Claims, 3 Drawing Sheets

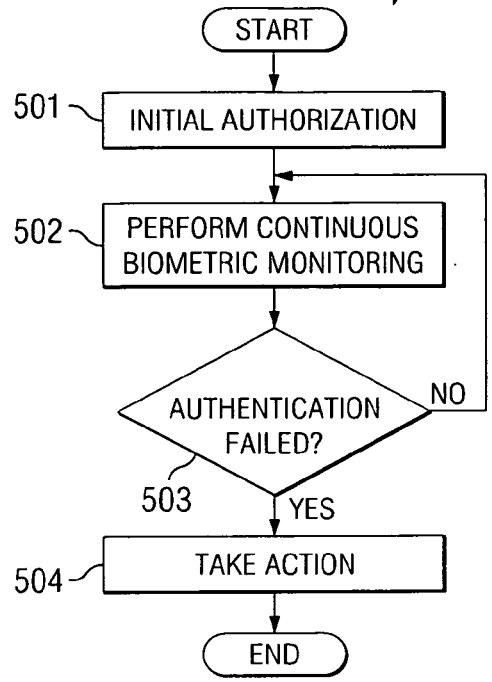
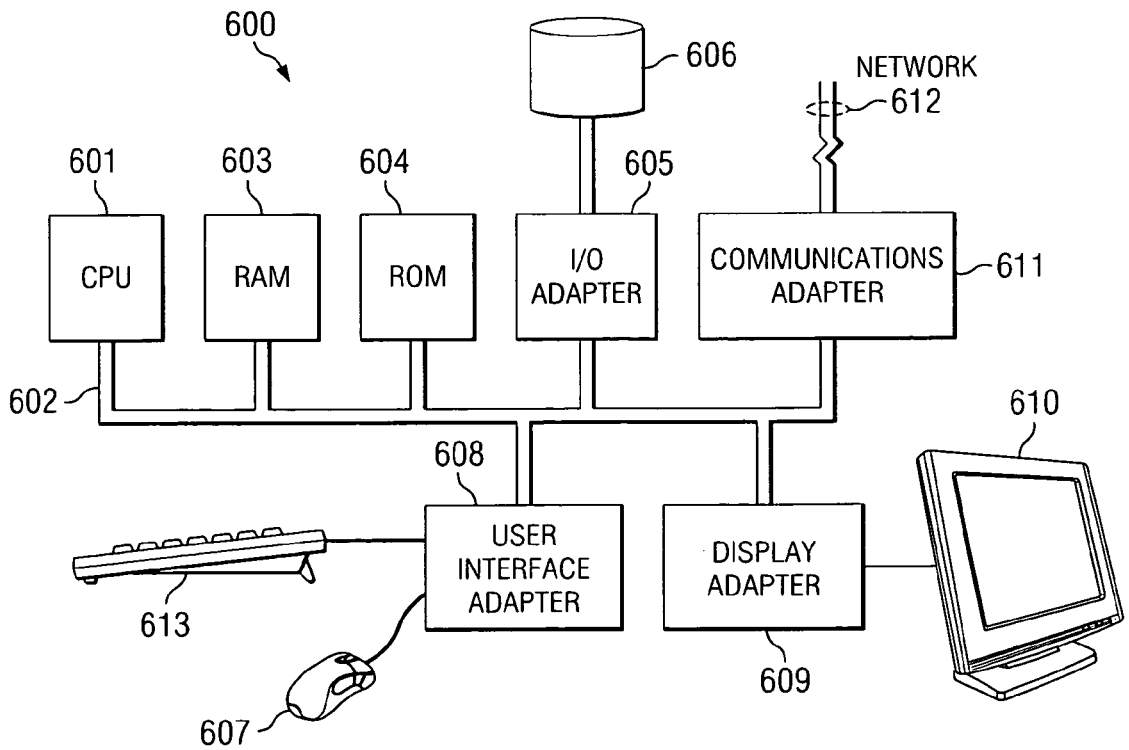

SYSTEMS AND METHODS FOR IDENTITY VERIFICATION USING CONTINUOUS BIOMETRIC MONITORING

RELATED APPLICATIONS

The present application is related to co-pending and commonly assigned U.S. patent applications Ser. No. 10/217,149 entitled "SYSTEM AND METHOD FOR CALL TREATMENT;" Ser. No. 10/642,532 entitled "CENTRALIZED CALL PROCESSING;" Ser. No. 10/701,549 entitled "SYSTEMS AND METHODS FOR CROSS-HATCHING BIOMETRICS WITH OTHER IDENTIFYING DATA;" and Ser. No. 11/334,522 entitled "SYSTEM AND METHOD FOR KEYWORD DETECTION IN A CONTROLLED ENVIRONMENT FACILITY USING A HYBRID APPLICATION;" the disclosures of each of which are hereby incorporated herein by reference in their entirety.

TECHNICAL FIELD

The present invention relates generally to identity verification, and more particularly, to identity verification using continuous biometric monitoring.

BACKGROUND OF THE INVENTION

Some telecommunication providers offer services to residents of controlled-environment facilities. Examples of controlled-environment facilities include prisons, police departments, hospitals, hospices, dorms, and camps, among others. In order to control, monitor, or restrict telephone usage among its residents, a controlled-environment facility may employ a call processing system.

In a typical call processing system, a personal identification number (PIN) authorization mechanism may request that a resident provide a PIN before placing or receiving a call. After the resident enters his or her PIN, the system determines the resident's identity and decides whether to allow him or her to operate a telephone. The call processing system may then apply a set of calling restrictions or rules associated with that resident. For example, some restrictions may prevent the resident from calling specific non-resident parties. Alternatively, other restrictions may only allow the resident to call specific parties and/or may establish a maximum number of calls that can be made or received by that resident at that time. Yet other restrictions may include preventing the resident from initiating a three-way call, taking part in a conference call, or the like.

An alternative to PIN-based systems involves the use of biometrics. The term "biometrics" refers to technologies that measure and analyze human characteristics for authentication purposes. A biometrics-based call processing system may acquire a resident's biometric sample before allowing the resident to place or receive a call. The system may use the biometric sample to determine the resident's identity, and it may then grant access to a telephone while applying a set of rules or restrictions associated with the resident.

The inventor hereof has discovered a number of problems with both PIN-based and biometric-based authorization mechanisms. Particularly, a problem unique to controlled-environment facilities such as prisons is that inmates frequently attempt to circumvent identity verification procedures. For example, inmates may share, trade, buy, and sell PINs, which may then be used by any person in possession thereof. An inmate having another's PIN may gain access to the system while avoiding particular call restrictions that would otherwise be applied to his or her calls. Moreover, an inmate may have his or her biometric feature scanned by a biometric authorization mechanism and, upon successful completion of this initial authentication procedure, he or she may hand the phone to another inmate who actually conducts the call. Consequently, authorities seldom know with certainty which inmate actually participated through the entire course of a phone call, despite the presence of a PIN and/or biometric identity verification procedure.

The inventor hereof has also identified a need to monitor and record the identity of a person who is actually participating in a telephone call, even if that person's identity is not susceptible to verification prior to, or during the ongoing call. For instance, when a crime suspect is arrested, he or she has the right to make a phone call. During this first phone call, the suspect may call a friend or a co-conspirator to provide instructions regarding a crime in which the suspect is involved. Accordingly, it would be useful to law enforcement agencies to have the ability to record the identity of that suspect while knowing with certainty that it was he or she who actually conducted the entire telephone conversation, even though his or her identity may only be ultimately verified or matched at a later time.

BRIEF SUMMARY OF THE INVENTION

Aspects of the present invention are directed generally to identity verification using biometric monitoring. In certain embodiments, the identity of a device operator may be verified through the continuous monitoring of at least one of his or her biometric traits. Therefore, even after the successful completion of an initial authentication procedure by which the device operator gains access to a device, embodiments of the present invention may continuously verify the operator's identity during operation of the device. The term "continuously," as used herein, means "constantly" or "reoccurring in rapid succession." As such, a record may be created which contains the biometric traits and/or the identity of all persons who have operated the device since the original authentication procedure. In addition, where there may be a need to control or otherwise restrict usage of a device according to access rules associated with a device operator, the present invention may allow these rules to be updated as a function of which operator is actually using the device.

Certain embodiments of the present invention are particularly well suited for use in the monitoring of telephone calls between residents and non-residents of controlled-environment facilities. Controlled-environment facilities include correctional facilities (e.g., municipal jails, county jails, state prisons, federal prisons, military stockades, juvenile facilities, detention camps, and home incarceration environments), healthcare facilities (e.g., hospitals, nursing homes, mental health facilities, and rehabilitation facilities, such as drug and alcohol rehabilitation facilities), restricted living quarters (e.g., hotels, resorts, camps, dormitories, and barracks), and the like. Certain controlled-environment facilities may be thought of as a small community or city, perhaps walled or otherwise access restricted, wherein various activities occur within the community and between the community and those outside the community in the daily operation thereof. Such a community may include a number of individuals and enterprises directly associated therewith, including management, staff, and inmates, residents, patients, or guests (herein referred to as "residents"), and a number of individuals and enterprises indirectly associated therewith, including friends and family of residents, vendors, government agencies, providers of services to residents, and individuals connections to the facility or its residents.

In one exemplary, non-limiting embodiment, a method may comprise determining the identity of a party to a telephone call by continuously monitoring a biometric feature of that party while the telephone call is in progress. If authentication fails while the call is ongoing, appropriate action may be taken. For instance, the call may be terminated, a warning may be issued, the call may be recorded, authorities may be allowed to listen in, etc. In another exemplary, non-limiting embodiment, a system may comprise a biometric sensor that is built into a telephone handset or otherwise placed near the telephone at a location where it is accessible to persons operating the telephone. The biometric sensor may take biometric readings of telephone users continuously, at selected time intervals, or upon the occurrence of a specific event, such as, for instance, a change in voice tone or print, the presence of a keyword or sound in the conversation, the expiration of a time limit, or the like. In addition, the system may comprise a database for verifying the biometric traits or the identity of persons who have used the telephone, and for storing a call record or a telephone conversation. Hence, an investigator may later retrieve those records and determine the identities of one or more of the parties that actually participated in the call and/or of one or more parties that participated in the call at particular times during the call.

The present invention has numerous advantages. For example, whereas prior art PIN and biometric authentication mechanisms only verify the identity of persons attempting to gain access to a device, the present invention may verify the identity of persons who have actually operated the device. For instance, if a person uses another's PIN to place a telephone call, the present invention may detect, via continuous biometric monitoring, that the PIN or biometric sample used to obtain access to the telephone does not belong to the person actually participating in the call. Moreover, if a person successfully completes an initial authentication procedure and subsequently hands off the phone to another person while the call is ongoing, the present invention may also detect that change and take appropriate action.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawings, in which:

FIG. 5 is a flowchart illustrating steps that may be performed during operation of certain embodiments of the present invention; and FIG. 6 depicts a block diagram of a computer system adapted for use according to embodiments of the present invention.

DETAILED DESCRIPTION OF THE INVENTION

Figure 1:
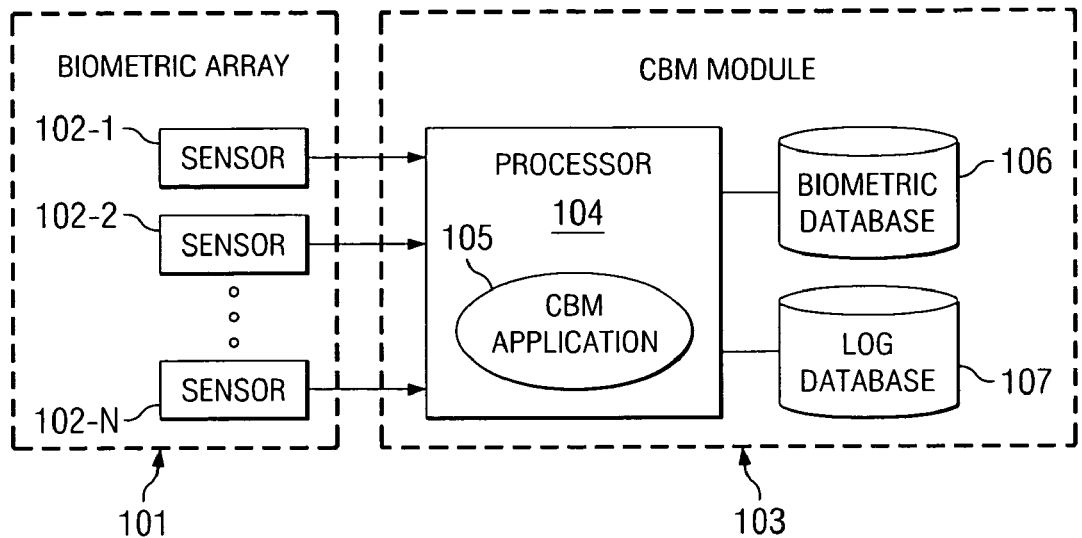
FIG. 1 is a high-level block diagram illustrating one embodiment of the present invention.

FIG. 1 is a high-level block diagram of Continuous Biometric Monitoring (CBM) system 100, according to an exemplary embodiment of the present invention. Biometric array 101 may have one or more biometric sensors (or scanners) 102-1, 102-2, . . . , 102-N (collectively "sensors 102"). Each of sensors 102 may be adapted to scan, for example: a physical biometric trait such as a fingerprint, thumbprint, or hand geometry; an aural biometric trait such as a voice or sound; or a visual biometric trait such as a retina, iris, or face. Sensors 102 may be any biometric sensor or scanner now existing or yet to be developed. Sensors 102 are connected to processor 104 of CBM module 103. Processor 104 is operable to execute CBM application 105. Processor 102 is also connected to biometric records database 106 and activity log database 107. According to certain embodiments of the present invention, any one or more of biometric array 101, processor 104, biometric records database 106, and activity log database 107 may be disposed within a call processing system. According to other embodiments, any one or more of these elements may be located at a user terminal (e.g., a telephone). Additionally or alternatively, any one or more of these elements may be remotely located with respect to the other components of CBS system 100.

In one exemplary embodiment, a user may attempt to operate a device (not shown) that is associated with biometric array 101. Biometric array 101 may be mounted on or built into the device, and at least one sensor 102 of biometric array 101 may continuously acquire at least one biometric sample from the operator while he or she operates the device. According to certain aspects of this exemplary embodiment, the "continuous monitoring" performed by CBS system 100 may be such that the interval of time between the acquisition of successive biometric samples from the operator is small compared to times typically required by actions performed by the operator during normal device operation. Further, it should be noted that continuous biometric reading may take place regardless of and/or in addition to an initially successful authentication procedure.

Biometric readings are communicated to processor 104, which executes instructions contained in CBM application 105. Processor 104 then compares biometric samples acquired by array 101 with biometric records or files stored in biometric records database 106. If the user's identity changes while the device is being operated, processor 104 may take appropriate action. For example, under the direction of instructions contained in CBM application 105, processor 104 may block access to the device by the unauthorized user. Alternatively, processor 104 may play an announcement to the parties involved in the operation of the device, place restrictions or otherwise limit functionality available to the current device operator, alert the authorities in charge of supervising operation of the device, and/or monitor or alter parameters related to the device's operation (e.g., increase sensitivity of 3-way call detection, increase level of web content filter, etc.), among others.

Processor 104 may record usage and other information in activity log database 107, including which operations were performed, the begin and end times of each operation, the biometric traits of the operator, the identity of the operator, as well as particular characteristics of the operation (e.g., telephone number dialed, a website visited, etc.), among others. This information may later be used, for example, as evidence to prove which persons actually participated in the operation of the device. Furthermore, in some situations, processor 104 may also record the operation itself in activity log database 107. For example, where the device is telephone, the telephone conversation may be stored in database 107 along with the associated usage information.

As a person of ordinary skill in the art will readily recognize in light of the present disclosure, system 100 may be employed in a wide variety of situations. Nonetheless, system 100 is particularly well suited for use in the monitoring of inmates' phone calls made to or from a prison. As previously noted, the unique problem involved in the monitoring of a prison's telephone system is that inmates constantly attempt to circumvent authentication procedures. For example, an inmate having another's PIN may gain access to the telephone system while avoiding particular call restrictions that would otherwise be applied to his or her calls. Moreover, an inmate may have his or her biometric feature scanned by the biometric authorization mechanism and then hand the phone off to another inmate who actually conducts the call. The inventor hereof has discovered that a solution to the aforementioned problem includes verifying the inmate's identity using continuous biometric monitoring as disclosed herein.

In one embodiment of the present invention, while at least one sensor (e.g., 102-1) continuously monitors a first biometric trait of the user, at least one other sensor (e.g., 102-2) monitors a second biometric trait of that user at selected time intervals, periodically, and/or upon the occurrence of a specific event, such as, for example, change in voice tone or print, detection of a keyword in the conversation, expiration of a time limit, etc. For instance, sensor 102-1 may continuously acquire a voice print from the user during a telephone conversation. If the voice print changes during the call, sensor 102-2 may scan the user's fingerprint in order to confirm the user's identity.

Figure 2:
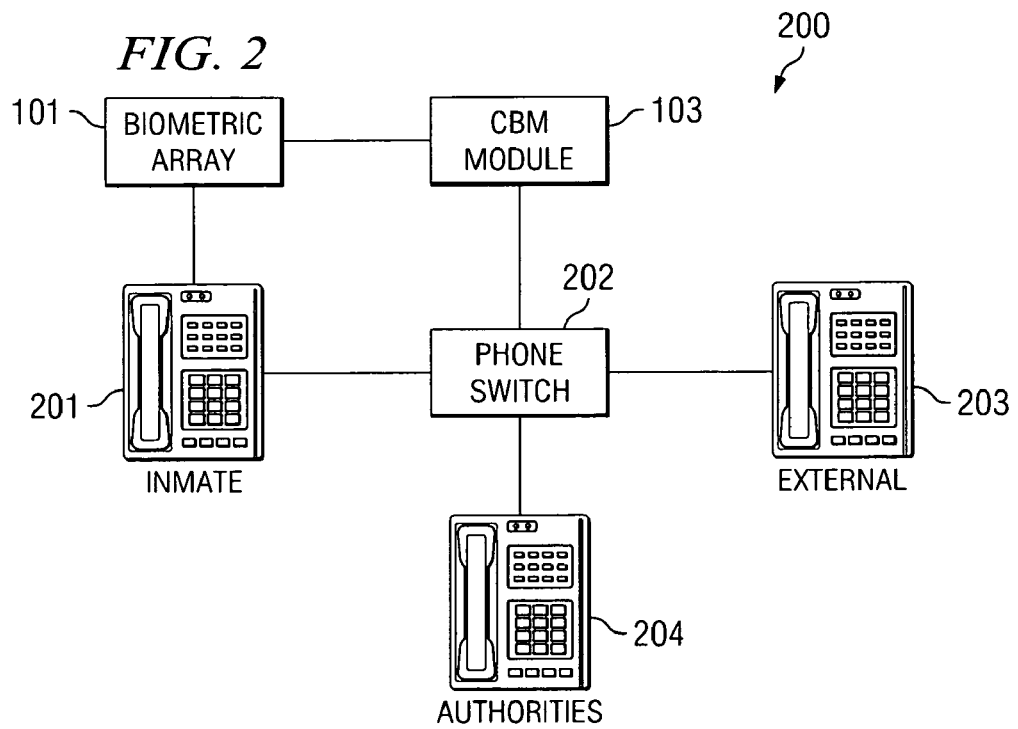
FIG. 2 is a high-level block diagram illustrating a system which is adapted for use according to one embodiment of the present invention.

FIG. 2 is a high-level block diagram of system 200 that is adapted for use according to an exemplary embodiment of the present invention. Inmate phone 201 (i.e., device) may be coupled to biometric array 101. Alternatively, biometric array 101 may be placed in proximity to inmate phone 201, so that a biometric trait of an inmate placing or receiving a phone call (i.e., device operator) from inmate phone 201 may be continuously monitored by at least one sensor of biometric array 101 during normal operation of inmate phone 201. Other biometric sensors of biometric array 101 may also take other biometric readings from the inmate at selected time intervals or upon the occurrence of a specific event. In one embodiment, at least one biometric sensor of biometric array 101 may be disposed to passively interface with the inmate so that the inmate does not have to perform any special action(s) for the sensor to acquire biometric samples from him or her. In another embodiment, system 200 may change the way it acquires biometric samples during a call. For example, system 200 may vary the way it acquires samples or the time intervals at which biometric readings are taken. Alternatively or additionally, system 200 may alternate which sensors of biometric array 101 perform biometric readings at any time. As such, system 200 may make it difficult or impossible for inmates to learn how to circumvent its monitoring.

Biometric array 101 is connected to CBM module 103, which may verify the inmate's identity. In one embodiment, biometric array 101 communicates with CBM module 103 via the phone line used by inmate phone 210. Biometric array 101 may also connected to CBM module 103 by dedicated wires, wirelessly (e.g., IEEE 802.11), or via a computer network. In other embodiments, CBM module 103 (or some portion thereof) may be embedded within inmate phone 210. Communications between inmate phone 201 and external phone 203 may travel through telephone switch 202, such as may comprise part of a service provider's call processing system or may be part of the Public Switched Telephone Network (PSTN), and which is connected to CBM module 103.

CBM module 103 may take action as specified by CBM application 105 depending upon whether identity verification is successful with respect to a call in progress. For example, CBM module 103 may control switch 202 in order to disconnect an ongoing call being conducted by an inmate other than the inmate initially authorized to participate in the call. CBM module 103 may also control switch 202 to tap into a phone call in order to allow authorities 204 to listen to an unauthorized ongoing conversation.

In one embodiment, an inmate enters a PIN number into inmate phone 201 to obtain initial identity verification in order to place or receive a call. In another embodiment, an inmate's Radio Frequency Identification (RFID) tag or bracelet is detected by an RFID reader (not shown) connected to CBM module 103 for granting initial access to inmate phone 201. Alternatively, the inmate engages biometric array 101 to perform an initial authentication procedure. Even after the inmate's identity has been verified, biometric array 101 may continue to monitor one or more of the inmate's biometric features. For example, one sensor of biometric array 101 may take biometric samples continuously while another sensor may take other biometric samples at selected time intervals, and/or upon the occurrence of a specific event, such as, for example, change in voice tone or print, presence of a keyword in the conversation, or the expiration of a time limit. In one embodiment, the conversation is continuously monitored for a change in voice print. Upon detection of change in voice print, system 200 may confirm the identity of the inmate currently the phone by taking another type of biometric sample from the inmate. Exemplary systems and methods for cross-hatching biometrics which may be used in conjunctions with system 200 are described in the above-referenced U.S. patent application entitled "SYSTEMS AND METHODS FOR CROSS-HATCHING BIOMETRICS WITH OTHER IDENTIFYING DATA." By using biometric cross-hatching, system 200 may increase the confidence level that the same inmate who was initially authorized to make or receive the call is the one actually conducting the conversation. In addition, system 200 may be used to monitor and record unlawful or undesirable activities in a call log database. And, as a person of ordinary skill in the art will readily recognize in light of this disclosure, system 200 may be used in a wide variety of environments where it may be necessary to determine the identity of a person who is actually operating a device.

Figure 3A:
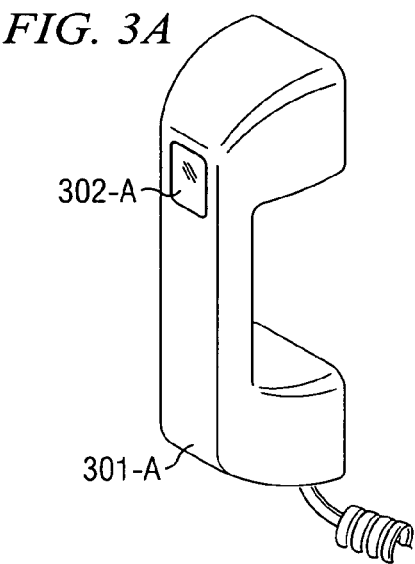
FIGS. 3A-3C show biometric telephone handsets used in certain embodiments of the present invention.
Figure 3B:
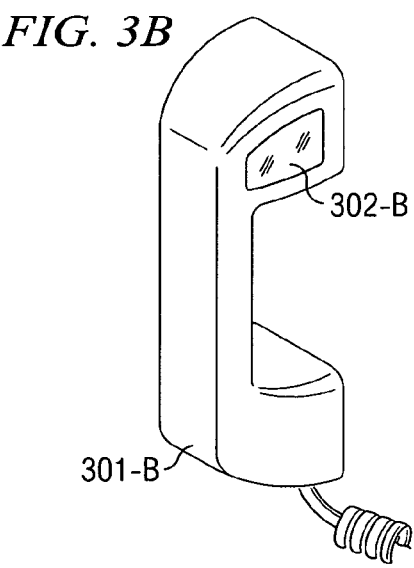
Figure 3C:
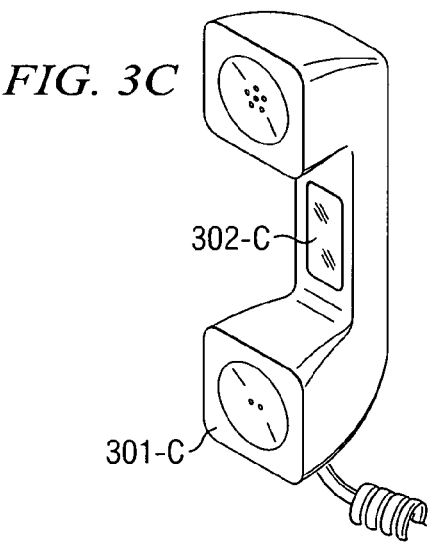

FIGS. 3A-3C are diagrams of biometric telephone handsets 301-A, 301-B, and 301-C (collectively "handsets 301"), which may be used in certain embodiments of the present invention. For example, biometric telephone handsets 301 may comprise biometric array 101 shown in the embodiment depicted in FIG. 2. In one embodiment, biometric handsets 301 may each include at least one biometric sensor 302-A, 302-B, and 302-C (collectively "sensors 302"), respectively disposed thereon. For example, sensors 302-A and 302-B may be adapted to scan thumbprints, whereas sensor 302-C may be adapted to scan one or more fingerprints. In alternative embodiments, sensor 302-C may be placed on the opposite surface of handset 301-C, and may be adapted to scan a hand feature. Moreover, more than one sensor 302 may be built into or coupled to a single handset 301.

Referring back to FIG. 1, system 100 need not be restricted to traditional telephone applications, but it may also be used, for example, in Voice over Internet Protocol (VoIP) applications. For example, a user may operate a computer system in order to make or receive a VoIP call. In this case, biometric array 101 may be placed, for instance, on a mouse or keyboard connected to the computer system.

Figure 4B:
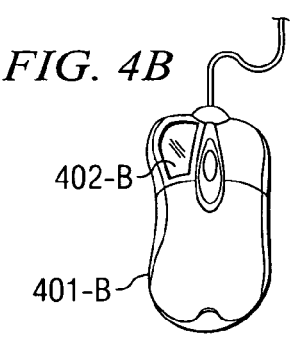
FIGS. 4A and 4B show biometric computer mice used in other embodiments of the present invention.
Figure 4A:
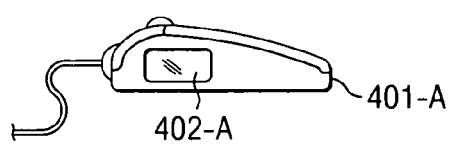

FIGS. 4A and 4B are diagram of biometric computer mice 401-A and 401 -B (collectively "mice 401"), which may be used in certain embodiments of the present invention. For example, biometric mice 401 may be used as biometric array 101 shown in the embodiment depicted in FIG. 2 and attached to a computer system (device), where the computer system may perform at least some of the functions of system 100. In one embodiment, biometric computer mice 401 may each include at least one biometric sensor 402-A and 402-B (collectively "sensors 402") disposed thereon. For example, sensor 402-A may be adapted to scan a thumbprint, whereas sensor 402-B may be adapted to scan a fingerprint. In an alternative embodiment, sensor 402-C may be placed on the top surface of mice 401 and may be adapted to scan a hand feature. Also, more than one sensor 402 may be used on a mouse 401.

In one embodiment, the computer system may be accessible in a restricted manner. In another embodiment, access to a computer program residing in the computer system, or a particular feature of the computer program, may be restricted to authorized users. In yet another embodiment, a website may be accessible in a restricted manner. For example, upon receiving a request for access, a restricted website may send or activate an authentication program within the computer system. The authentication program may contain instructions for performing continuous biometric monitoring while users visit the website.

In one embodiment, a user enters a password or a combination of username and password in order to make or receive a VoIP call and/or to gain access to a computer system, program, or website. Alternatively, the user may provide a biometric sample for initial identity verification via mouse 401. After the user has been granted access, mouse 401 may continuously take biometric samples from the user in order to verify the identity of the user while the VoIP call is in progress or while the computer system, program, or website is being accessed. The computer system compares biometric samples acquired by mouse 401 with biometric records or files stored in the computer. If the user's identify verification fails while he or she is conducting the VoIP call or accessing the computer, program, or website, processor 104 may take appropriate action. As such, the computer system may guarantee that the same user who was initially authorized to use the system, program, or website is the one actually using it. In addition, the computer system may be used to monitor and record the user's activities.

FIG. 5 is a flowchart illustrating steps that may be performed in carrying out functions of described embodiments of the present invention, for example, as shown in FIG. 2. In step 501, an inmate may use a telephone to start an initial authentication procedure, for example, by inputting a PIN or by having an RFID device scanned by an RFID reader. Alternatively, the inmate may initiate the authentication procedure by having a biometric trait acquired by a biometric sensor. After successful completion of initial authentication step 501, biometric samples may continuously be monitored in step 503. Other biometric samples may also be monitored at selected time intervals and/or upon the occurrence of a specific event, such as, for instance, a change in voice tone or print, the presence of a keyword in the conversation, and the expiration of a time limit.

Still in step 503, a match is sought for biometric samples acquired and a determination is made of whether the identity of the inmate currently participating in the ongoing telephone call matches the identity of the inmate originally authorized to place or receive the call. If the continuous authentication of steps 502 and 503 fails, appropriate action may be taken in step 504. For example, the ongoing call may be disconnected, a warning may be issued to the inmate or a third party, the call may be recorded, and/or authorities may be requested to listen to the conversation. Others actions may include recording usage parameters, including the called or calling number, the begin and end times of the call, the biometric traits of the inmate who initially authenticated the call along with her identity, the biometric traits of the inmate who actually participated in the call along with her identity, and/or a recording of the conversation.

FIG. 6 illustrates computer system 600 adapted to use embodiments of the present invention, e.g., storing and/or executing software associated with embodiments described herein. Particularly, computer system 600 may be adapted to be used as CBM module 103, depicted in FIGS. 1 and 2. Central processing unit (CPU) 601 is coupled to system bus 602. CPU 601 may be any general purpose CPU. However, embodiments of the present invention are not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) controller card 605, communications adapter card 611, user interface card 608, and display card 609. I/O adapter card 605 connects storage devices 606, such as one or more of a hard drive, a CD drive, a floppy disk drive, a tape drive, to computer system 600. In one embodiment, storage devices 606 may comprise biometric records database 106 and call log database 107, depicted in FIGS. 1 and 2. I/O adapter 605 is also connected to a printer (not shown), which may allow the system to print paper copies of information such as documents, photographs, articles, and the like. Note that the printer may be a printer (e.g., dot matrix, laser, and the like), a fax machine, scanner, or a copier machine. Communications card 611 is adapted to couple the computer system 600 to network 612, which may be one or more of a telephone network, a local (LAN) and/or a wide-area (WAN) network, an Ethernet network, and/or the Internet network. Communications card 611 may also allow computer system 601 to communicate with telephone switch 202, depicted in FIG. 2. User interface card 608 couples user input devices, such as keyboard 613, pointing device 607, and the like, to computer system 600. Display card 609 is driven by CPU 601 to control the display on display device 610.

Program, software, and code segments making up the various embodiments of the present invention, including CBM application 105 (depicted in FIG. 1), may be stored in a computer readable medium or transmitted by a computer data signal embodied in a carrier wave, or a signal modulated by a carrier, over a transmission medium. The term "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. A computer data signal may include any signal that can propagate over a transmission medium such as electronic network channels, optical fibers, air, electromagnetic, RF links, and the like. Furthermore, code segments described herein may be downloaded via computer networks such as the Internet, Intranet, and the like.

Although aspects of the present invention and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, means, methods, and steps described in the specification. As a person of ordinary skill in the art will readily appreciate from the disclosure of the present invention, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

What is claimed is:

1. A method comprising:
   authorizing a resident of a controlled-environment facility to participate in a telephone call;
   continuously monitoring a first biometric trait of a person participating in the telephone call;
   verifying whether the first biometric trait of the person participating in the telephone call belongs to an authorized resident; and
   monitoring a second biometric trait of the person participating in the telephone call at selected intervals to confirm an identity of that person.

2. The method of claim 1 wherein the controlled-environment facility is a prison.

3. The method of claim 1 wherein authorizing the resident to participate in the telephone call comprises requesting that the resident provide a personal identification number.

4. The method of claim 1 wherein authorizing the resident to participate in the telephone call comprises acquiring a biometric sample from the resident.

5. The method of claim 1 wherein authorizing the resident to participate in the telephone call comprises acquiring an RFID information associated with the resident.

6. The method of claim 1 further comprising terminating the telephone call if the biometric trait of the person participating in the telephone call does not belong to the authorized resident.

7. The method of claim 1 further comprising blocking a telephone function if the first biometric trait of that person does not belong to the authorized resident.

8. The method of claim 1 further comprising alerting a party if the biometric trait of the person participating in the telephone call does not belong to the authorized resident.

9. The method of claim 1 further comprising recording an identity of the person participating in the telephone call if the first biometric trait of that person does not belong to the authorized resident.

10. The method of claim 1 further comprising recording at least a portion of the telephone call if the first biometric trait of the person participating in the telephone call does not belong to the authorized resident.

11. The method of claim 10 further comprising storing the portion of the telephone call along with the first biometric trait of the person participating in the portion of the telephone call.

12. A method comprising:
    authorizing a resident of a controlled-environment facility to participate in a telephone call;
    continuously monitoring a first biometric trait of a person participating in the telephone call;
    verifying whether the first biometric trait of the person participating in the telephone call belongs to an authorized resident; and
    monitoring a second biometric trait of the person participating in the telephone call upon the occurrence of an event detected via the monitoring of the first biometric trait to confirm an identity of that person.

13. A call processing system for monitoring an identity of a resident of a controlled environment facility participating in an ongoing telephone call, the call processing system comprising:
    a biometric sensor associated with a controlled-environment facility's telephone;
    a continuous biometric monitoring (CBM) module coupled to the biometric sensor and adapted to continuously acquire a biometric sample from the resident during the ongoing telephone call, wherein the CBM module is adapted to use the biometric sample to verify, during the ongoing telephone call, whether a biometric trait of the resident belongs to an authorized resident, the CBM further adapted to monitor a second biometric trait of the resident during the telephone call upon the occurrence of an event detected via the monitoring of the first biometric trait and to confirm an identity of that person using the second biometric trait.

14. The call processing system of claim 13, wherein the biometric sensor is positioned to passively acquire the biometric sample from the resident.

15. The call processing system of claim 13 wherein the CBM module is adapted to determine the identity of the resident by comparing the biometric sample acquired from the resident with a biometric record stored in a biometric records database.

16. The call processing system of claim 13 wherein the CBM module is adapted to use the biometric sample to determine the identity of the resident participating in the ongoing telephone call has changed during the call.

17. The call processing system of claim 13 further comprising a telephone switch connected to the CBM module.

18. The call processing system of claim 17 wherein the telephone switch is adapted to terminate the ongoing telephone call if the resident is not authorized to participate in the ongoing telephone call.

19. The call processing system of claim 17 wherein the telephone switch is adapted to issue a warning if the resident is not authorized to participate in the ongoing telephone call.

20. The call processing system of claim 17 wherein the telephone switch is adapted to allow authorities to listen to the ongoing telephone call if the resident is not authorized to participate in the ongoing telephone call.

21. The call processing system of claim 17 wherein the CBM module is adapted to record the ongoing telephone call if the resident is not authorized to participate in the ongoing telephone call.

22. A biometric telephone handset for use in a controlled-environment facility's telephone system, the handset comprising:

a first physical biometric sensor adapted to continuously scan a first physical biometric trait of a resident during an ongoing telephone call; and a second biometric sensor adapted to scan a second biometric trait of the resident during the ongoing telephone call, the scanning of the second biometric trait triggered by the occurrence of an event detected while the monitoring the first biometric trait, the second biometric trait used to confirm an identity of the resident.

23. The biometric telephone handset of claim 22 wherein the controlled-environment facility is a prison.

24. The biometric telephone handset of claim 22 wherein the first biometric sensor is a fingerprint scanner.

25. The biometric telephone handset of claim 22 wherein the first biometric sensor is a handprint scanner.

26. The biometric telephone handset of claim 22 wherein the second biometric sensor scans the second biometric trait at selected time intervals.

* * * * *